(12) United States Patent
Miyamoto et al.

(10) Patent No.: US 9,548,030 B2
(45) Date of Patent: Jan. 17, 2017

(54) IMAGE DISPLAY DEVICE AND IMAGE DISPLAY METHOD

(71) Applicants: NEC CORPORATION, Tokyo (JP); NEC DISPLAY SOLUTIONS, LTD., Tokyo (JP)

(72) Inventors: Junichi Miyamoto, Tokyo (JP); Shuichi Nakanishi, Tokyo (JP)

(73) Assignees: NEC CORPORATION, Tokyo (JP); NEC DISPLAY SOLUTIONS, LTD., Tokyo (JP)

(*) Notice: Subject to any disclaimer, the term of this patent is extended or adjusted under 35 U.S.C. 154(b) by 0 days.

(21) Appl. No.: 14/435,717

(22) PCT Filed: Oct. 22, 2013

(86) PCT No.: PCT/JP2013/078542
§ 371 (c)(1),
(2) Date: Apr. 14, 2015

(87) PCT Pub. No.: WO2014/083970
PCT Pub. Date: Jun. 5, 2014

(65) Prior Publication Data
US 2015/0287366 A1     Oct. 8, 2015

(30) Foreign Application Priority Data

Nov. 30, 2012   (JP) ................................ 2012-262783

(51) Int. Cl.
G09G 3/34       (2006.01)
H04N 9/31       (2006.01)
(Continued)

(52) U.S. Cl.
CPC ......... *G09G 3/3413* (2013.01); *G03B 21/2033* (2013.01); *G03B 21/2053* (2013.01);
(Continued)

(58) Field of Classification Search
CPC .............. G02F 1/13473; G02F 2001/133613; G02F 2001/13312; G02B 27/102; G02B 27/283; G02B 27/149; G02B 13/16; G02B 27/141; G03B 33/08; G03B 21/2053; G03B 21/204; G03B 27/735; G03B 21/2013; G03B 21/208; G03B 33/12; G03B 17/18; G03B 17/20; H04N 1/486; H04N 1/60; G09G 2320/0666; G09G 2320/041; G09G 2360/145; G09G 3/3413; G09G 3/2003; G09G 5/02; G09G 2320/0242; G09G 2310/0235; G09G 2320/064; G09G 2320/0276; G09G 2320/0673; G09G 2360/144; G09G 3/3406; G09G 3/3611; G01J 3/51

See application file for complete search history.

(56) References Cited

U.S. PATENT DOCUMENTS 9,022,578 B2*  5/2015  Nakanishi .............. G03B 21/16
                                                    348/747
2005/0157274 A1*  7/2005  Lin ........................ G03B 21/26
                                                    353/84

(Continued)

FOREIGN PATENT DOCUMENTS

JP    2004-184852 A1   7/2004
JP    2006-011263 A    1/2006

(Continued)

OTHER PUBLICATIONS

International Search Report (ISR) (PCT Form PCT/ISA/210), in PCT/JP2013/078542, dated Dec. 3, 2013.

*Primary Examiner* — Sanjiv D Patel
(74) *Attorney, Agent, or Firm* — McGinn IP Law Group, PLLC (57) ABSTRACT

A light quantity measurement unit measures a quantity of light of a light source that has a first light-emitting element
(Continued)

that emits light of a first wavelength band and a second light-emitting element that emits light of a second wavelength band. The light quantity measurement unit includes first and second filters having the first and second wavelength bands as the detection wavelength bands. The first and second light-emitting elements are caused to sequentially emit light, and on the basis of the results of measurement of the quantity of light that is measured by way of the first and second filters, a control unit generates first compensation information in which light of the second wavelength band is measured with the first filter and second compensation information in which light of the first wavelength band is measured with the second filter, finds a first compensation light quantity of the first light-emitting element by excluding the quantity of light based on the first compensation information from the quantity of light that is measured by way of the first filter, finds a second compensation light quantity of the second light-emitting element by excluding a quantity of light based on the second compensation information from the quantity of light measured by way of the second filter, and then controls the quantity of light of the first and second light-emitting elements based on the first and second compensation light quantities.

9 Claims, 7 Drawing Sheets (51) Int. Cl.
G03B 21/20 (2006.01)
G03B 33/06 (2006.01)
G03B 33/12 (2006.01)
G09G 3/36 (2006.01)
G02B 27/18 (2006.01)

(52) U.S. Cl.
CPC ............. *G03B 33/06* (2013.01); *G03B 33/12* (2013.01); *G09G 3/3648* (2013.01); *H04N 9/3155* (2013.01); *H04N 9/3158* (2013.01); G02B 27/18 (2013.01); G09G 2310/0235 (2013.01); G09G 2320/045 (2013.01)

(56) References Cited

U.S. PATENT DOCUMENTS

| | | | | |
|---|---|---|---|---|
| 2005/0248733 A1* | 11/2005 | Sakata | ................. | H04N 9/3117 353/94 |
| 2006/0066266 A1* | 3/2006 | Li Lim | ............. | G02F 1/133603 315/291 |
| 2007/0052928 A1* | 3/2007 | Maeda | ............... | G02B 27/1026 353/20 |
| 2007/0285530 A1* | 12/2007 | Kim | ........................ | H04N 9/735 348/223.1 |
| 2008/0054818 A1* | 3/2008 | Soo | ....................... | G09G 3/3413 315/247 |
| 2010/0039452 A1* | 2/2010 | Park | ..................... | G09G 3/3413 345/690 |
| 2010/0053136 A1* | 3/2010 | Ohta | .................... | G09G 3/3413 345/211 |
| 2010/0085338 A1* | 4/2010 | Miguchi | ........... | G02F 1/133609 345/207 |
| 2010/0188443 A1* | 7/2010 | Lewis | .................... | G02B 26/02 345/691 |
| 2011/0304659 A1* | 12/2011 | Lee | ........................ | G03B 21/14 345/694 |
| 2012/0188458 A1* | 7/2012 | Imai | ................... | G02B 27/1046 348/571 |

FOREIGN PATENT DOCUMENTS

| | | |
|---|---|---|
| JP | 2006-308631 A | 11/2006 |
| JP | 2007-329591 A1 | 12/2007 |
| JP | 2008-009240 A | 1/2008 |
| WO | WO 2011/037014 A1 | 3/2011 |

\* cited by examiner

| | G Filter | | | | B Filter | | |
|---|---|---|---|---|---|---|---|
| | Measured Quantity of Light | Quantity of light originating from G-LED (G-LED compensation light quantity) | Quantity of light originating from B-LED | Measured Quantity of Light | Quantity of Light originating from G-LED | | Quantity of light originating from B-LED (B-LED compensation light quantity) |
| Color Temperature 1 | 120 | 100 | 20 | 140 | 40 | | 100 |
| Color Temperature 2 | 100 | 80 | 20 | 132 | 32 | | 100 |
| First Implementation of Control | 121.6 | 100 | 21.6 | 148 | 40 | | 108 |
| Second Implementation of Control | 118.4 | 98.4 | 20 | 139.36 | 39.36 | | 100 |
| Third Implementation of Control | 120.128 | 100 | 20.128 | 140.64 | 40 | | 100.64 |
| Fourth Implementation of Control | 119.872 | 99.872 | 20 | 139.9488 | 39.9488 | | 100 |
| Fifth Implementation of Control | 120.01024 | 100 | 20.01024 | 140.0512 | 40 | | 100.0512 |
| Sixth Implementation of Control | 119.98976 | 99.98976 | 20 | 139.995904 | 39.995904 | | 100 |
| Seventh Implementation of Control | 120.0008192 | 100 | 20.0008192 | 140.004096 | 40 | | 100.004096 |
| Eighth Implementation of Control | 119.9991808 | 99.9991808 | 20 | 139.9996723 | 39.99967232 | | 100 |
| Ninth Implementation of Controls | 120.0000655 | 100 | 20.00006554 | 140.0003277 | 40 | | 100.0003277 |
| Tenth Implementation of Control | 119.9999345 | 99.99993446 | 20 | 139.9999738 | 39.99997379 | | 100 |

Fig.9

| | G Filter | | | B Filter | | |
|---|---|---|---|---|---|---|
| | Measured Quantity of Light | Quantity of light originating from G-LED (G-LED compensation light quantity) | Quantity of light originating from B-LED | Measured Quantity of Light | Quantity of Light originating from G-LED | Quantity of light originating from B-LED (B-LED compensation light quantity) |
| Color Temperature 1 | 120 | 100 | 20 | 140 | 40 | 100 |
| Color Temperature 2 | 100 | 80 | 20 | 132 | 32 | 100 |
| First Implementation of Control | 120 | 100 | 20 | 140 | 40 | 100 |
| Second Implementation of Control | 120 | 100 | 20 | 140 | 40 | 100 |
| Third Implementation of Control | 120 | 100 | 20 | 140 | 40 | 100 |
| Fourth Implementation of Control | 120 | 100 | 20 | 140 | 40 | 100 |
| Fifth Implementation of Control | 120 | 100 | 20 | 140 | 40 | 100 |
| Sixth Implementation of Control | 120 | 100 | 20 | 140 | 40 | 100 |
| Seventh Implementation of Control | 120 | 100 | 20 | 140 | 40 | 100 |
| Eighth Implementation of Control | 120 | 100 | 20 | 140 | 40 | 100 |
| Ninth Implementation of Controls | 120 | 100 | 20 | 140 | 40 | 100 |
| Tenth Implementation of Control | 120 | 100 | 20 | 140 | 40 | 100 |

Fig.10

IMAGE DISPLAY DEVICE AND IMAGE DISPLAY METHOD

TECHNICAL FIELD

The present invention relates to an image display device and to an image display method, and more particularly relates to an image display device and an image display method for displaying images using a plurality of light-emitting elements that simultaneously emit light of mutually differing colors.

BACKGROUND ART

Patent Document 1 discloses a technology for realizing optimum color mixing ratios and high luminance by combining green light from two different directions of a cross-dichroic prism and further combining the green light with red light and blue light. In other words, a high-luminance image display device is realized by using three liquid crystal panels of red, green and blue and causing a blue LED and green LED to simultaneously emit light and irradiate the same liquid crystal panel for blue.

Patent Document 2 discloses a technology for combining the output light from a plurality of light-emitting elements that emit light of different colors, then detecting, for each color, a portion of the combined light by using color filters that correspond to each light color, and then using these values to control the output of the light source.

LITERATURE OF THE PRIOR ART

Patent Documents

Patent Document 1: International Publication WO2011/037014
Patent Document 2: Japanese Unexamined Patent Application Publication No. 2008-9240

SUMMARY OF THE INVENTION

Problem to be Solved by the Invention

Typically, the problem arises in which changes occur in the colors and white balance of a projected image due to changes that occur over time in the light source. In particular, in an image display device such as disclosed in Patent Document 1, even when light that occurs by combining is separated for each color and detected as disclosed in Patent Document 2, it was not possible to determine the color of the liquid crystal panel on which the light had been irradiated. Still further, regarding light that is irradiated on the blue liquid crystal panel, even if this light is detected for each color by using color filters, the wavelength characteristic of filters of this color results in simultaneous detection of not only the light for which detection is desired but also the light of other colors, whereby high-precision adjustment of the output of each light-emitting element becomes problematic.

It is therefore an object of the present invention to provide an image display device and image display method capable of solving the above-described problem.

Means for Solving the Problem

The image display device of the present invention is an image display device that includes:

a first light source having a first light-emitting element that emits light of a first wavelength band and a second light-emitting element that emits light of a second wavelength band that differs from the first wavelength band;

a first image formation element that uses the output light from the first light source to form an image;

a light quantity measurement unit that measures the quantity of light of the output light of the first light source; and a control unit that controls the quantity of light based on the measurement result of the light quantity measurement unit;

wherein the light quantity measurement unit includes a first filter that takes the first wavelength band as its main detection wavelength band and a second filter that takes the second wavelength band as its main detection wavelength band;

the control unit causes the first light-emitting element and the second light-emitting element to sequentially emit light, acquires from the light quantity measurement unit each of the light quantity measurement results that were measured by way of the first filter and the second filter, and based on the light quantity measurement results generates first compensation information in which light of the second wavelength band was measured by the first filter and second compensation information in which light of the first wavelength band was measured by the second filter;

finds a first compensation light quantity with respect to the first light-emitting element by excluding the quantity of light based on the first compensation information from the quantity of light that was measured by way of the first filter and controls the quantity of light of the first light-emitting element based on the first compensation light quantity; and finds a second compensation light quantity with respect to the second light-emitting element by excluding the quantity of light based on the second compensation information from the quantity of light that was measured by way of the second filter and controls the quantity of light of the second light-emitting element based on the second compensation light quantity.

The image display method of the present invention is an image display method that is carried out by an image display device that includes a first light source that has a first light-emitting element that emits light of a first wavelength band, and a second light-emitting element that emits light of a second wavelength band that differs from the first wavelength band, a first image formation element that uses the output light from the first light source to form an image, and a light quantity measurement unit that measures the quantity of light of the output light of the first light source, wherein the light quantity measurement unit includes a first filter that takes the first wavelength band as its main detection wavelength band and a second filter that takes the second wavelength band as its main detection wavelength band; the image display method including:

causing the first light-emitting element and the second light-emitting element to sequentially emit light, acquiring from the light quantity measurement unit each of the light quantity measurement results that were measured by way of the first filter and the second filter, and based on the light quantity measurement results, generating first compensation information in which light of the second wavelength band was measured by the first filter and second compensation information in which light of the first wavelength band was measured by the second filter;

finding a first compensation light quantity with respect to the first light-emitting element by excluding the quantity of light based on the first compensation information from the quantity of light that was measured by way of the first filter and controlling the quantity of light of the first light-emitting element based on the first compensation light quantity; and finding a second compensation light quantity with respect to the second light-emitting element by excluding a quantity of light that is based on the second compensation information from the quantity of light that was measured by way of the second filter and controlling the quantity of light of the second light-emitting element based on the second compensation light quantity.

Effect of the Invention

The present invention enables high-precision adjustment of the output of a light-emitting element.

MODE FOR CARRYING OUT THE INVENTION

The image display device and image display method of exemplary embodiments of the present invention are next described.

First Exemplary Embodiment

Figure 1:
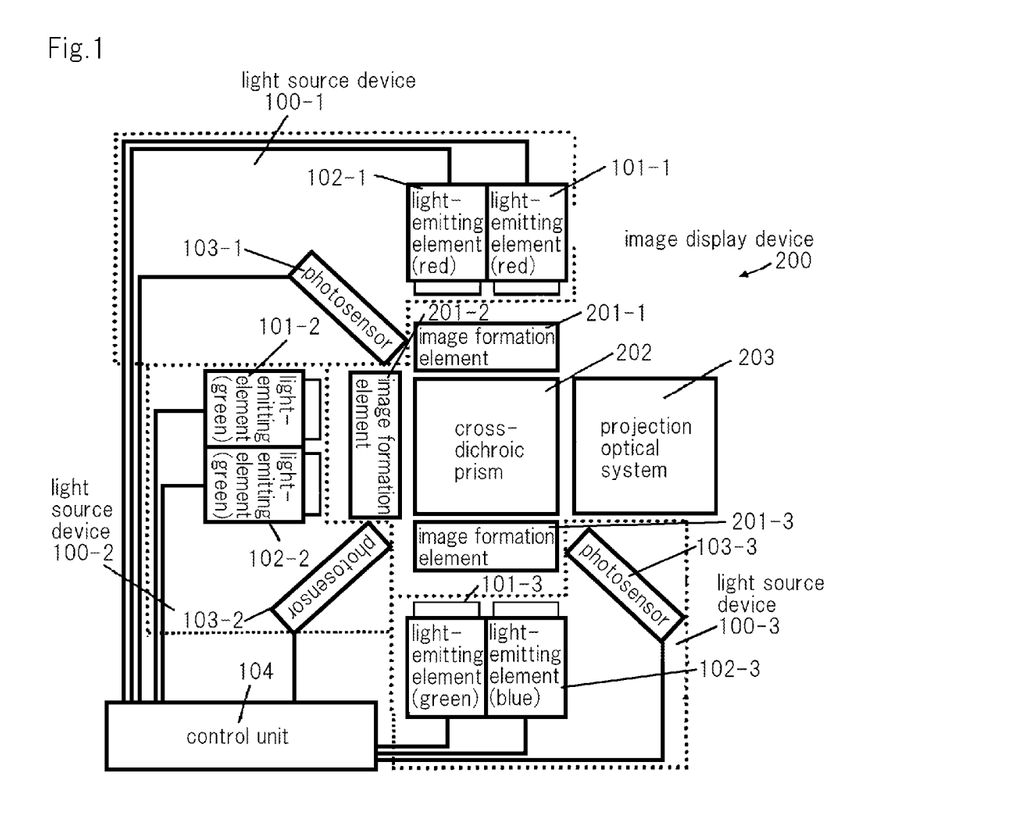
FIG. 1 is a block diagram showing image display device 200 of the first exemplary embodiment of the present invention.

FIG. 1 is a block diagram showing image display device 200 of the first exemplary embodiment of the present invention.

In FIG. 1, image display device 200 is equipped with light source devices 100-1-100-3, image formation elements 201-1-201-3, cross-dichroic prism 202, projection optical system 203, and control unit 104.

Light source device 100-1 includes light-emitting element 101-1 and 102-1, and photosensor 103-1. Light source device 100-2 includes light-emitting element 101-2 and 102-2 and photosensor 103-2. Light source device 100-3 includes light-emitting element 101-3 and 102-3 and photosensor 103-3.

The first light source is made up of light-emitting elements 101-3 and 102-3. The second light source is made up of light-emitting elements 101-1 and 102-1. The third light source is made up of light-emitting elements 101-2 and 102-2.

Photosensor 103-3 is one example of the light quantity measurement unit.

Light-emitting elements 101-1-101-3 and 102-1-102-3 are, for example, LEDs or semiconductor lasers (laser diodes). In the present exemplary embodiment, an LED is used for each of light-emitting elements 101-1-101-3 and 102-1-102-3.

Light-emitting elements 101-1 and 102-1 are red LEDs that emit light of the red (R) wavelength band (hereinbelow referred to as "R-LEDs").

Light-emitting elements 101-2 and 102-2 are green LEDs that emit light of the green (G) wavelength band (hereinbelow referred to as "G-LEDs").

Light-emitting element 101-3 is one example of the first light-emitting element and is a G-LED. The green (G) wavelength band is one example of the first wavelength band.

Light-emitting element 102-3 is one example of the second light-emitting element, and is a blue LED that emits light of the blue (B) wavelength band (hereinbelow referred to as a "B-LED"). The blue (B) wavelength band is one example of the second wavelength band.

Image formation elements 201-1-201-3 are, for example, liquid crystal light valves.

Image formation element 201-1 is one example of the second image formation element and modulates the intensity of red light from light-emitting elements 101-1 and 102-1 in accordance with a red image that is based on a video signal. In other words, image formation element 201-1 uses red light output from light-emitting elements 101-1 and 102-1 to form images.

Image formation element 201-2 is one example of the third image formation element and modulates the intensity of green light output from light-emitting elements 101-2 and 102-2 in accordance with a green image based on a video signal. In other words, image formation element 201-2 uses green light output from light-emitting elements 101-2 and 102-2 to form images.

Image formation element 201-3 is one example of the first image formation element and modulates the intensity of green light output from light-emitting element 101-3 and blue light output from light-emitting element 102-3 in accordance with a blue image that is based on a video signal. In other words, image formation element 201-3 uses the green light from output light-emitting element 101-3 and blue light output from light-emitting element 102-3 to form images.

Cross-dichroic prism 202 is one example of the mixing optical system and mixes the light that was subjected to intensity modulation and emitted by image formation element 201-1, the light that was subjected to intensity modulation and emitted by image formation element 201-2, and the light that was subjected to intensity modulation and emitted by image formation element 201-3 into one light beam to generate image light. Cross-dichroic prism 202 emits the image light toward projection optical system 203.

Projection optical system 203 projects the image light from cross-dichroic prism 202 onto a display surface such as a screen (not shown).

Typically, when semiconductor light sources such as LEDs are used as the light sources of each of red, green, and blue and the red, green, and when blue light from each semiconductor light source is combined to obtain white light having superior white balance, the amount of blue that is output is made smaller than that of the other colors and the amount of green light that is output is made greater than that of the other colors.

As a result, in the present exemplary embodiment, a configuration is adopted in which optical device 100-3 is configured to include green light-emitting element 101-3 and blue light-emitting element 102-3, and that, by combining green light from two different directions, adds green light and decreases the quantity of blue light, for which the light output is relatively great. As a result, the three primary colors can be combined at the optimum mixing ratio and white light having superior white balance can be obtained.

Photosensor 103-1 includes a red filter (hereinbelow referred to as an "R filter") and measures the quantity of light from light-emitting elements 101-1 and 102-1 by way of the R filter. The R filter takes the wavelength band of the color red as its principal detection wavelength band.

Photosensor 103-2 has a green filter (hereinbelow referred to as a "G filter") and measures the quantity of light from light-emitting elements 101-2 and 102-2 by way of the G filter. The G filter takes the wavelength band of the color green as its principal detection wavelength band.

Photosensor 103-3 has an R filter, a G filter, and a blue filter (hereinbelow referred to as a "B filter"). The G filter is one example of the first filter. The B filter is one example of the second filter. The B filter takes the wavelength band of the color blue as its principal detection wavelength band. Photosensor 103-3 measures the quantity of light of the output light from light-emitting elements 101-3 and 102-3 by way of the R filter, further measures the quantity of light of output light from light-emitting elements 101-3 and 102-3 by way of the G filter, and finally, measures the quantity of light of the output light from light-emitting elements 101-3 and 102-3 by way of the B filter.

When photosensors 103-1-103-3 are of the same configuration, photosensors 103-1 and 103-2 may be of the same configuration as photosensor 103-3.

In addition, photosensor 103-3 may have a G filter and a B filter without including an R filter, and may measure the quantity of light of the output light from light-emitting elements 101-3 and 102-3 by way of the G filter, and moreover, may measure the quantity of light of the output light from light-emitting elements 101-3 and 102-3 by way of the B filter.

Figure 2:
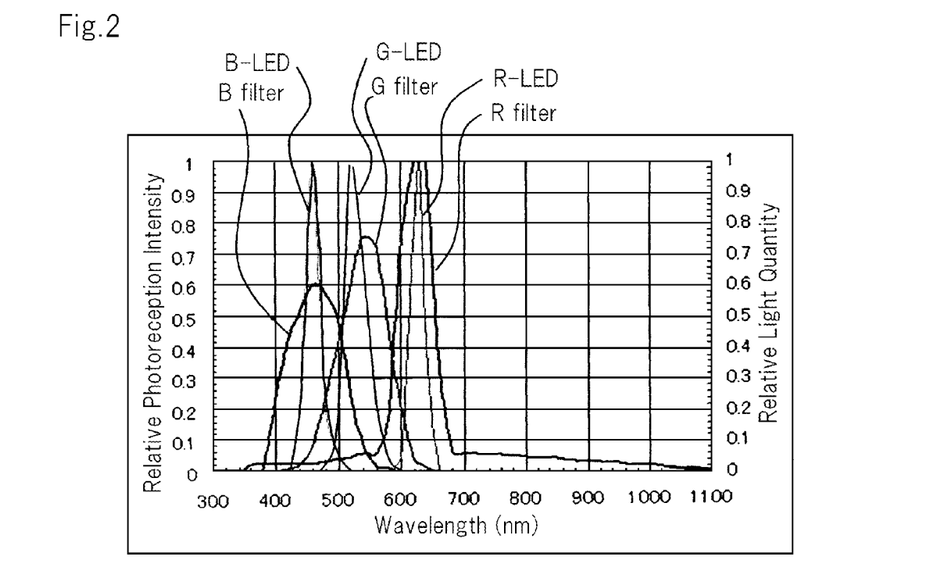
FIG. 2 shows the wavelength spectrum of the quantity of light emitted by an R-LED, G-LED, and B-LED and the intensity (light detection wavelength band) of light that has passed through each of the R filter, the G filter, and the B filter and that was detected by a photosensor.

FIG. 2 shows the wavelength spectrum of the quantity of light emitted by the R-LED, G-LED, and B-LED and the intensity (photo-detection wavelength band) of light that passes through each of the R filter, G filter, and B filter and that is photo-detected by the photosensors.

As shown in FIG. 2, the R filter transmits a greater amount of red light from the R-LED than light of any of other colors. However, The photo-detection wavelength band of the R filter does not completely match with the wavelength band of red light from the R-LED and contains the wavelength band of light from the G-LED and the wavelength band of light from the B-LED.

The G filter transmits more green light from the G-LED than light of any of the other colors. However, the photo-detection wavelength band of the G filter does not completely match the wavelength band of green light from the G-LED and contains the wavelength band of light from the B-LED and the wavelength band of light from the R-LED.

The B filter transmits more blue light from the B-LED than light of any of the other colors. However, the photo-detection wavelength band of the B filter does not completely match the wavelength band of blue light from the B-LED and contains the wavelength band of light from the G-LED.

Figure 3:
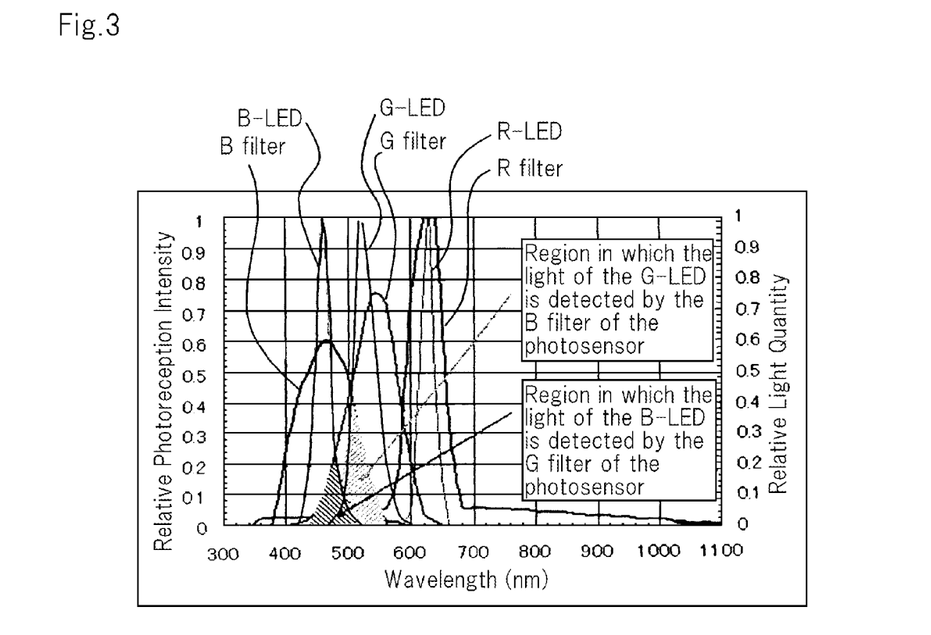
FIG. 3 shows the detection of light of a portion of the wavelength band of the G-LED through the B filter and the detection of light of a portion of the wavelength band of the B-LED through the G filter.

As a result, in photosensor 103-3, when light-emitting element (G-LED) 101-3 and light-emitting element (B-LED) 102-3 together emit light, a portion of the light from light-emitting element 102-3 is contained in addition to light from light-emitting element 101-3 in the light photo-detected by way of the G filter and further, a portion of the light from light-emitting element 101-3 is contained in addition to light from light-emitting element 102-3 in the light that is photo-detected by way of the B filter (see FIG. 3).

Control unit 104 controls the quantity of light from each light-emitting element based on the measurement results of photosensors 103-1-103-3. In addition, control unit 104 controls each of the image formation elements 201-1-201-3 in accordance with the red images, green images, and blue images.

Control unit 104 supplies drive signals to each of light-emitting elements 101-1-101-3 and 102-1-102-3 to modulate the output light from light-emitting elements 101-1-101-3 and 102-1-102-3. As an example, pulse-width modulation (PWM) signals are used as the drive signals.

If a relationship between a PWM signal and the lighting and extinguishing of a light-emitting element is set such that the light-emitting element lights up when the PWM signal is ON and is extinguished when the PWM signal is OFF, the brightness of the light-emitting elements can be adjusted by changing the time proportion of ON and OFF to change the time proportion of lighting and extinguishing.

Because a low frequency is perceived as flickering by the human eye, the frequency of one cycle of lighting/extinguishing is normally set to the order of 200-500 Hz.

With the duty of the PWM signal at any value of from 0% to 100%, control unit 104 constantly extinguishes a light-emitting element at 0%, constantly lights up a light-emitting element at 100%, and at, for example, x %, lights up a light-emitting element for x % of the time of one lighting/extinguishing cycle (one period) and extinguishes the light-emitting element for (100−x) % of the time.

The operation is next described.

Control unit 104 supplies a PWM signal of a predetermined duty (where the duty is greater than 0% and less than 100%) to each of light-emitting elements 101-3 and 102-3 to cause light-emitting elements 101-3 and 102-3 to emit light.

Control unit 104 next sends a measurement start signal to photosensor 103-3.

Photosensor 103-3, having received the measurement start signal, measures the quantity of light of light (green light and blue light) that is supplied from light-emitting elements 101-3 and 102-3 both by way of the G filter and by way of the B filter.

After the passage of a fixed time interval from sending the measurement start signal to photosensor 103-3, control unit 104 receives from photosensor 103-3 light quantity information that indicates at least the total quantity of light that photosensor 103-3 received in a fixed time interval by way of the G filter (hereinbelow referred to as "light quantity $I^G_{G+B}$") and the total quantity of light that photosensor 103-3 received in a fixed time interval by way of the B filter (hereinbelow referred to as "light quantity $I^B_{G+B}$").

Light quantity $I^G_{G+B}$ includes the quantity of light of green light that was received from light-emitting element 101-3 by way of the G filter and the quantity of light of blue light that was received from light-emitting element 102-3 by way of the G filter.

In addition, light quantity $I^B_{G+B}$ includes the quantity of light of blue light that was received from light-emitting element 102-3 by way of the B filter and the quantity of light of green light that was received from light-emitting element 101-3 by way of the B filter.

Of light quantity $I^G_{G+B}$, the light quantity of green light that was received from light-emitting element 101-3 is here taken as compensation light quantity $I^G_G$. In addition, of light quantity $I^B_{G+B}$, the light quantity of blue light that was received from light-emitting element 102-3 is taken as compensation light quantity $I^B_B$.

Compensation light quantities $I^G_G$ and $I^B_B$ are then obtained by means of the relation represented by the following Formula (1). In Formula (1), $F^G$ and $F^B$ are functions composed of light quantity $I^G_{G+B}$ and light quantity $I^B_{G+B}$.

Formula (1)

$$I_G^G = F^G(I_{B+G}^G, I_{B+G}^B)$$

$$I_B^B = F^B(I_{B+G}^B, I_{B+G}^G) \quad (1)$$

Control unit 104 determines the drive signal to be applied to light-emitting element 101-3 such that compensation light quantity $I^G_G$ becomes the quantity of light that was predesignated.

Control unit 104 further determines the drive signal to be applied to light-emitting element 102-3 such that compensation light quantity $I^B_B$ becomes the quantity of light that was predesignated.

By adopting this form, the quantity of light from each light-emitting element can be controlled without being affected by the brightness of the other light-emitting elements, and the ratio of the light quantities from light-emitting element 101-3 and light-emitting element 102-3 can be maintained at the light quantity ratio that was designated in advance.

The following Formula (2) is one example of Formula (1). Here, correction information $\alpha_G$ and $\beta_B$ in Formula (2) are examples of compensation information and are fixed values.

Correction information $\alpha_G$ indicates the proportion (hereinbelow referred to as "the degree of leakage") of the light quantity of green light from light-emitting element 101-3 that is measured by way of the B filter with respect to the light quantity of green light from light-emitting element 101-3. Correction information $\alpha_G$ indicates compensation information (second compensation information) for specifying the amount of green light from light-emitting element 101-3 that is photo-detected at photosensor 103-3 by way of the B filter.

Correction information $\alpha_B$ indicates the proportion (hereinbelow referred to as the "degree of leakage") of the quantity of blue light from light-emitting element 102-3 that is measured by way of the G filter with respect to the quantity of blue light from light-emitting element 102-3. Correction information $\alpha_B$ indicates the compensation information (first compensation information) for specifying the amount of blue light from light-emitting element 102-3 that is photo-detected at photosensor 103-3 by way of the G filter.

Formula (2)

$$I_G^G = \frac{I_{B+G}^G - \alpha_B I_{B+G}^B}{1 - \alpha_G \alpha_B}$$

$$I_B^B = \frac{I_{B+G}^B - \alpha_G I_{B+G}^G}{1 - \alpha_G \alpha_B} \quad (2)$$

By using Formula (2), control unit 104 is able to uniquely calculate compensation light quantities $I^G_G$ and $I^B_B$ from the measured light quantities $I^G_{G+B}$ and $I^B_{G+B}$. However, because the quantity of light does not become a negative value, when the calculated value becomes negative, control unit 104 regards the compensation light quantity as "0".

The correction procedure for obtaining correction information $\alpha_G$ and $\alpha_B$ is next described.

Upon receiving a signal from the outside instructing transition to the correction mode, control unit 104 transitions to the correction mode.

Upon entering the correction mode, control unit 104 sends to light-emitting element 102-3 a drive signal such that light-emitting element 102-3 is extinguished, and moreover, sequentially transmits to light-emitting element 101-3 drive signals corresponding to the duty cycle of several points that exclude, of the values of the duty cycle of a PWM signal from 0% to 100%, the value of 0%. Light-emitting element 101-3 lights up based on the set duty.

On the other hand, photosensor 103-3 measures the quantity of light that is emitted from light-emitting element 101-3 in accordance with the set duty.

Photosensor 103-3 supplies light quantity information indicating the quantity of light photo-detected by way of the R filter, the quantity of light photo-detected by way of the G filter, and the quantity of light photo-detected by way of the B filter to control unit 104.

Control unit 104 receives the light quantity information from photosensor 103-3 and saves the light quantity values indicated in the light quantity information in association with the duty cycle that was set in the drive signals.

Figure 4:
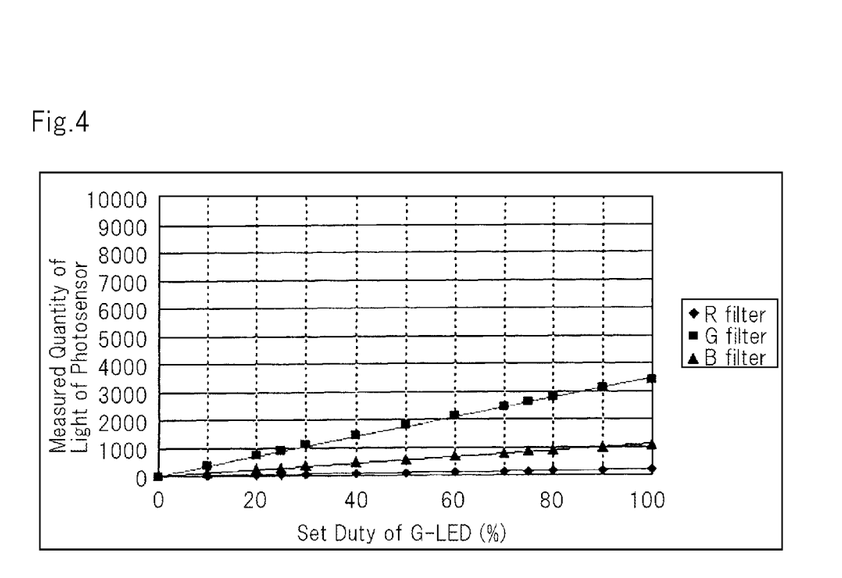
FIG. 4 shows the relation of the light quantities measured by way of each of the filters of photosensor 103-3 according to the set duty of light-emitting element 101-3 in control unit 104.

FIG. 4 shows the relation of the light quantities measured by way of each filter of photosensor 103-3 that accord with the set duty cycle of light-emitting element 101-3 in control unit 104.

Figure 5:
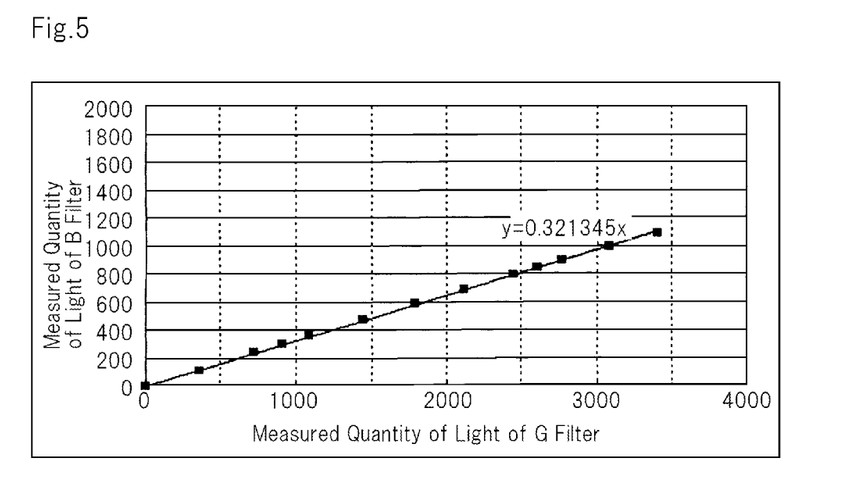
FIG. 5 shows the relation between the quantity of light measured by way of the G filter and the quantity of light measured by way of the B filter in the example shown in FIG. 4.

FIG. 5 shows the relation between the light quantity measured by way of the G filter and the light quantity measured by way of the B filter in the example shown in FIG. 4.

Control unit 104 obtains the inclination of the line that linearly approximates the points that were plotted as shown in FIG. 5. Control unit 104 stores the inclination as correction information $\alpha_G$.

Control unit 104 next transmits to light-emitting element 101-3 a drive signal such that light-emitting element 101-3 is extinguished, and moreover, sequentially transmits to light-emitting element 102-3, for example, drive signals corresponding to the duty cycle of several points that exclude, of the values of the duty cycle of a PWM signal from 0% to 100%, the value of 0%. Light-emitting element 102-3 lights up based on the duty cycle that was set.

Photosensor 103-3 measures the quantity of light that is emitted from light-emitting element 102-3 in accordance with the duty cycle that was set.

Photosensor 103-3 supplies to control unit 104 light quantity information that indicates the quantity of light that was photo-detected by way of the R filter, the quantity of light that was photo-detected by way of the G filter, and the quantity of light that was photo-detected by way of the B filter.

Control unit 104 receives the light quantity information from photosensor 103-3 and saves the light quantity values indicated in the light quantity information in association with the duty cycle that was set in the drive signals.

Figure 6:
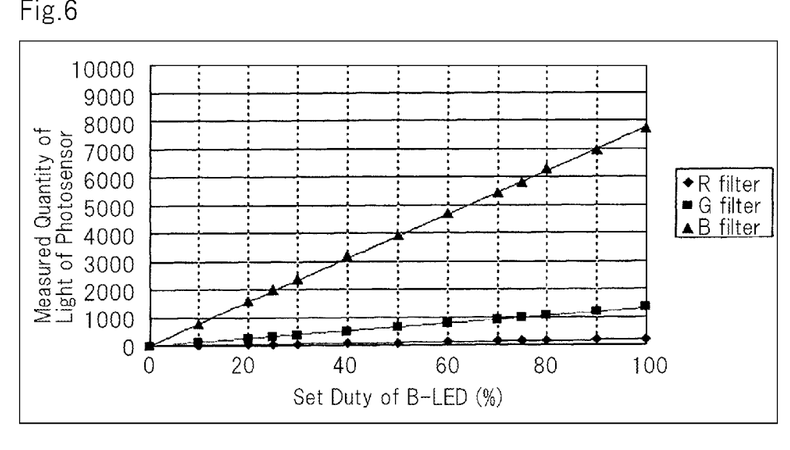
FIG. 6 shows the relation of the quantities of light measured by way of each filter of photosensor 103-3 according to the set duty of light-emitting element 102-3 in control unit 104.

FIG. 6 shows the relation of the light quantities measured by way of each filter of photosensor 103-3 according to the set duty cycle of light-emitting element 102-3 in control unit 104.

Figure 7:
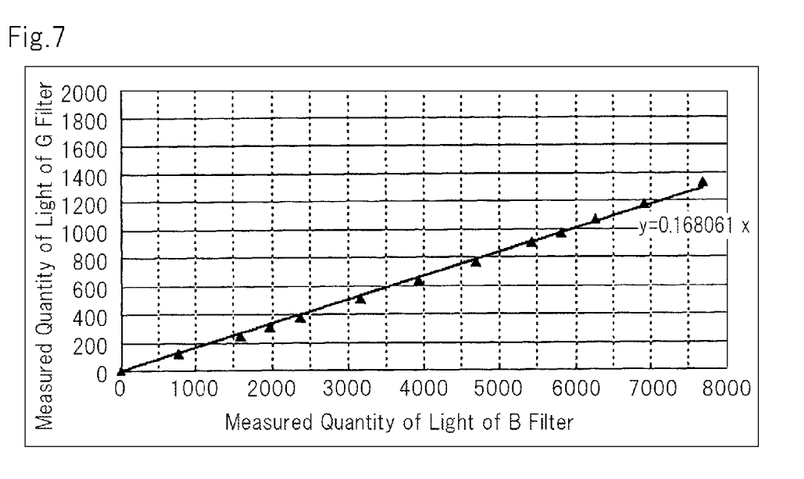
FIG. 7 shows the relation between the quantity of light measured by way of the B filter and the quantity of light measured by way of the G filter in the example shown in FIG. 6.

FIG. 7 shows the relation between the light quantity measured by way of the B filter and the light quantity measured by way of the G filter in the example shown in FIG. 6.

Control unit 104 obtains the inclination of the line that linearly approximates the points plotted as shown in FIG. 7. Control unit 104 stores the inclination as correction information $\alpha_B$.

Having calculated correction values $\alpha_G$ and $\alpha_B$, control unit 104 terminates the correction mode and returns to the normal mode for controlling the brightness of the light source.

In the normal mode, control unit 104 uses the correction information $\alpha_G$ and $\alpha_B$ that were calculated in the correction mode to compensate light quantities $I^G_{G+B}$ and $I^B_{G+B}$ that were measured in photosensor 102-3 in accordance with Formula (2) and thus calculate compensation light quantities $I^G_G$ and $I^B_B$.

Then, as described hereinabove, control unit 104 determines the drive signal that is to be applied to light-emitting element 101-3 such that compensation light quantity $I^G_G$ becomes the quantity of light that was predesignated and supplies this drive signal to light-emitting element 101-3. Control unit 104 further determines the drive signal to be applied to light-emitting element 102-3 such that the compensation light quantity $I^B_B$ becomes the quantity of light that was predesignated and supplies this drive signal to light-emitting element 102-3.

In light source device 100-1, light-emitting elements 101-1 and 102-1 both emit red light, and control unit 104 therefore does not carry out the correction procedure for the output of photosensor 103-1 (output that indicates the quantity of light photo-detected by way of the R filter). Control unit 104 determines the drive signals that are to be applied to light-emitting elements 101-1 and 102-1 such that the output of photosensor 103-1 becomes the quantity of light that was predesignated and supplies these drive signals to light-emitting elements 101-1 and 102-1.

In light source device 100-2, light-emitting element 101-2 and 102-2 both emit green light, and control unit 104 therefore does not carry out the correction procedure for the output of photosensor 103-2 (output that indicates the quantity of light photo-detected by way of the G filter). Control unit 104 determines the drive signals to be applied to light-emitting elements 101-2 and 102-2 such that the output of photosensor 103-2 becomes the quantity of light that was predesignated and supplies these drive signals to light-emitting elements 101-2 and 102-2.

An example of the "predesignated light quantity" that was mentioned above is next described.

Control unit 104 first supplies a red image video signal, a green image video signal, and a blue image video signal to each of image formation elements 201-1-201-3 such that a white image is displayed on the screen that is the display surface.

Control unit 104 next, in accordance with an adjustment instruction that is applied from the outside, adjusts the brightness of light source device 100-3 (the brightness of the output light of light-emitting element 101-3 and light-emitting element 102-3) such that the white image displayed on the screen becomes the desired white image).

Upon completion of the adjustment of the brightness of light source device 100-3, control unit 104 saves each of light quantity L1 that was measured by photosensor 103-1 by way of the R filter, light quantity L2 that was measured by photosensor 103-2 by way of the G filter, and compensation light quantity $I^G_G$ (hereinbelow referred to as "light quantity L3") and compensation light quantity $I^B_B$ (hereinbelow referred to as "light quantity L4") that were calculated from light quantities $I^G_{G+B}$ and $I^B_{G+B}$ that were measured by photosensor 103-3 by way of the G filter and the B filter at the time of the completion of adjustment.

Light quantity L1 is then used as the quantity of light that was predesignated for photosensor 103-1, and light quantity L2 is used as the quantity of light that was predesignated for photosensor 103-2. In addition, light quantity L3 is used as the quantity of light that was predesignated for compensation light quantity $I^G_G$, and light quantity L4 is used as the quantity of light that was predesignated for compensation light quantity $I^B_B$.

Control unit 104 then controls the quantity of light of each of light-emitting elements 101-1-101-3 and 102-1-102-3 such that the output of photosensor 103-1 (output that indicates the quantity of light photo-detected by way of the R filter) is kept at light quantity L1, the output of photosensor 103-2 (output that indicates the quantity of light photo-detected by way of the G filter) is kept at light quantity L2, the compensation light quantity $I^G_G$ is kept at light quantity L3, and the compensation light quantity $I^B_B$ is kept at light quantity L4 to maintain the white balance of the image on the display surface.

An example of the control when changing the color temperature is next described.

When the white balance of color temperature 1 has been established, the light quantity measured by way of the G filter of photosensor 103-3 is assumed to be 120, and the light quantity measured by way of the B filter of photosensor 103-3 is assumed to be 140.

On the other hand, when the white balance of color temperature 2 has been established, the light quantity measured by way of the G filter of photosensor 103-3 is assumed to be 100 and the light quantity measured by way of the B filter of photosensor 103-3 is assumed to be 132.

Compared to color temperature 2, color temperature 1 is assumed to be realized by increasing only the duty cycle that is applied to light-emitting element 102-3 (blue), the increase of the ratio of blue resulting in white with a blue tinge.

While color temperature 2 is being set, control is implemented such that the quantity of light measured by way of the G filter of photosensor 103-3 is 100 and the quantity of light measured by way of the B filter of photosensor 103-3 is 132.

When the color temperature is here altered from color temperature 2 to color temperature 1, control unit 104 begins controlling the quantity of light from light-emitting element 101-3 and 102-3 such that the quantity of light measured by way of the G filter of photosensor 103-3 becomes 120 and the quantity of light measured by way of the B filter of photosensor 103-3 becomes 140.

In the related art, a drive signal having a duty cycle set to increase the quantity of light by 20 is applied to light-emitting element 101-3 (green) such that the quantity of light measured by way of the G filter of photosensor 103-3 becomes the value 120 in the case of color temperature 1 from the value 100 in the case when set to color temperature 2, and further, a drive signal having a duty cycle set to increase the quantity of light by 8 is applied to light-emitting element 102-3 (blue) such that the quantity of light measured by way of the B filter of photosensor 103-3 becomes the value 140 in the case of color temperature 1 from the value 132 in the case when set to color temperature 2.

In this case, the light from light-emitting elements 101-3 and 102-3 influences each of the quantity of light measured by way of the G filter of photosensor 103-3 and the quantity of light measured by way of the G filter of photosensor 103-3. As a result, at the first implementation of control, the quantity of light measured by way of the G filter of photosensor 103-3 does not become 120 (becoming, for example, 121.6) and the quantity of light measured by way of the B filter of photosensor 103-3 does not become 140 (becoming, for example, 148).

In contrast, in the present exemplary embodiment that employs light quantity compensation, control unit 104 uses $\alpha_G$ and $\alpha_B$ (for example, $\alpha_G=0.4$ and $\alpha_B=0.2$) that were obtained by correction in advance to implement control by means of compensation light quantities $I^G{}_G$ and $I^B{}_B$.

Control unit 104 applies to light-emitting element 101-3 (green), a drive signal having a duty cycle set to increase the compensation light quantity by 20 such that compensation light quantity $I^G{}_G$ becomes the value 100 in the case of color temperature 1 from the value 80 that is set at the time of color temperature 2.

Compensation light quantity $I^B{}_B$ becomes the value 100 in the case of color temperature 1 even when set to color temperature 2, and the duty cycle that is set to light-emitting element 102-3 (blue) therefore does not change. As a result, in a single implementation of control, the quantity of light measured by way of the G filter of photosensor 103-3 becomes 120, the quantity of light measured by way of the B filter of photosensor 103-3 becomes 140, compensation light quantity $I^G{}_G$ becomes 100, compensation light quantity $I^B{}_B$ becomes 100, whereby setting to the color temperature that is regarded as the target can be achieved in a single implementation of control.

Figure 8:
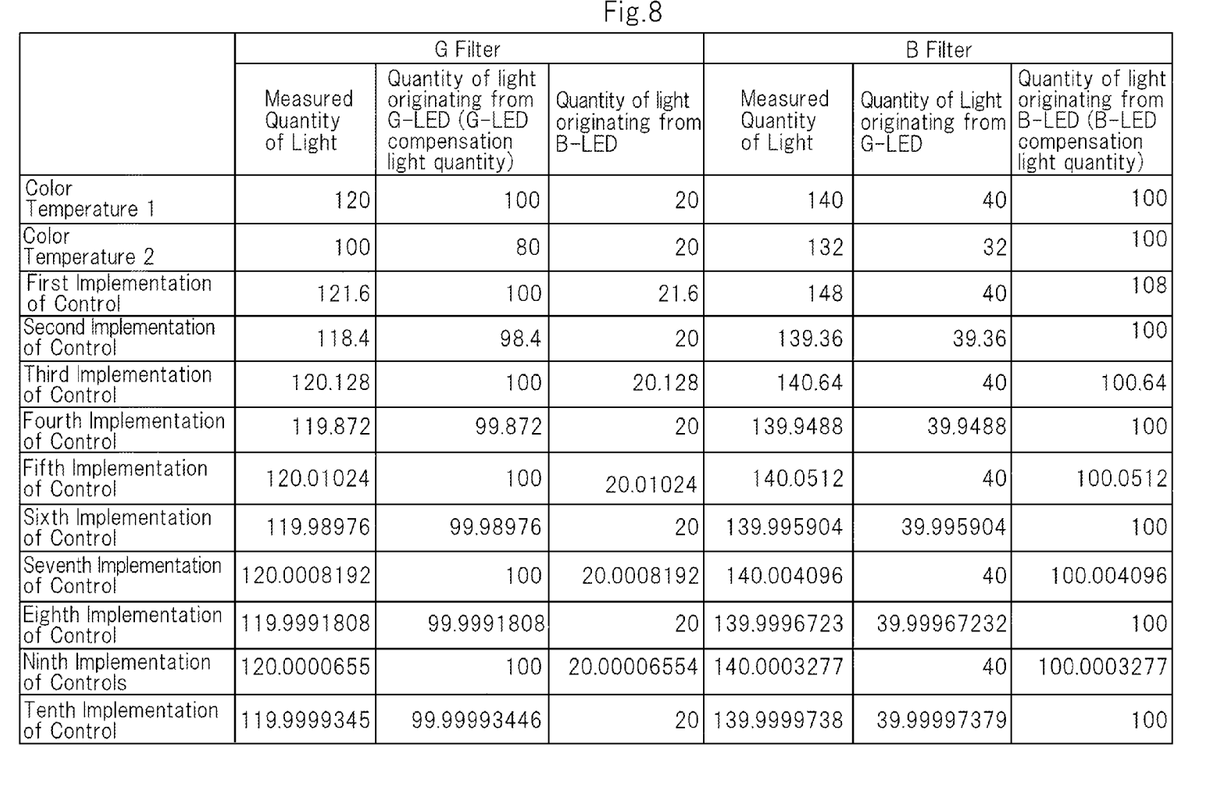
FIG. 8 shows an example of the values of the quantity of light for each number of implementations of control in a control method of the related art.

FIG. 8 shows an example of the light quantity values for each implementation of control by the control method of the related art.

Figure 9:
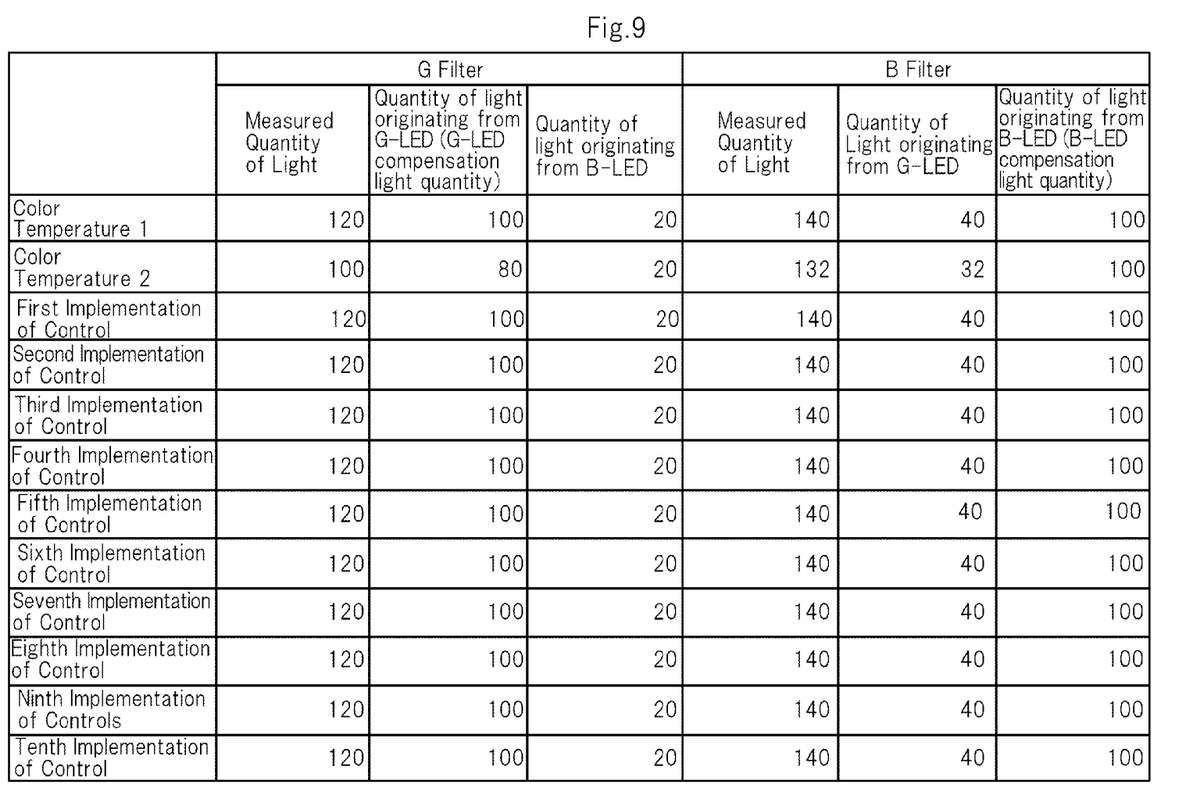
FIG. 9 shows an example of the values of the quantity of light for each number of implementations of control in the control method that uses the light quantity compensation of the present exemplary embodiment.

FIG. 9 shows an example of the light quantity values for each implementation of control by the control method that uses the light quantity compensation of the present exemplary embodiment.

In the control method of the related art, the measured light quantity does not converge on the desired light quantity unless control is repeated, but in the control method that uses the light quantity compensation of the present exemplary embodiment, the measured light quantity converges on the targeted light quantity in essentially the first instance of control.

If the period of executing light quantity control is assumed to be one frame of the image display, control unit 104 becomes capable of changing the color temperature with each frame, whereby the color temperature can be altered adaptively according to the image being displayed.

In addition, when the quantity of light of a predetermined color of red, green, or blue is to be adjusted, control unit 104 may adjust the quantity of light of the light-emitting element that corresponds to the predetermined color rather than adjust the quantity of light in image formation elements 201-1, 201-2, or 201-3.

For example, when a particular white balance (RGB light quantity ratio) is obtained by correction (the G light quantity at this time being, for example, 1) and an image is displayed in which the level of the G component is ½, the gain of the image formation elements is normally made ½ while keeping the G light quantity unaltered (G light quantity=1), but here, the G light quantity is set to ½ by making the gain of the image formation elements "1" with the G light quantity at ½. In this case, a reduction in the power consumption in the light-emitting element can be achieved.

When the light quantity of a predetermined color of red, green, or blue is to be adjusted, the light quantity may be adjusted not only by adjusting the light quantity in the image formation elements, but also by adjusting both the gain of the image formation elements and the light quantity of the light-emitting elements.

For example, when a particular white balance (RGB light quantity ratio) is obtained by correction (the G light quantity at this time being, for example, 1) and the G component is to be adjusted, the G light quantity is normally kept unchanged (G light quantity=1) and the gain of the image formation elements is varied between 0 and 1 to adjust the level of the G component, but here, the image contrast (the number of gradations) can be increased by further adjusting the G light quantity from 0 and 1.

The effect of the present exemplary embodiment is next described.

According to the present exemplary embodiment, photosensor 103-3 that includes a G filter and a B filter measures the light quantity of the output light from light-emitting element (G-LED) 101-3 and light-emitting element (B-LED) 102-3. Control unit 104 controls the quantity of light from light-emitting elements 101-3 and 102-3 based on the measurement results of photosensor 103-3.

Control unit 104 then causes light-emitting elements 101-3 and 102-3 to sequentially emit light and acquires each of the measurement results (refer to FIGS. 4 and 6) measured by sensor 103-3 by way of the G filter and B filter. Based on the measurement results, control unit 104 generates compensation information $\alpha_B$ for measuring blue light from light-emitting element 102-3 at the G filter and compensation information $\alpha_G$ for measuring green light from light-emitting element 101-3 at the B filter.

Control unit 104 finds the first compensation light quantity from light-emitting element (G-LED) 101-3 by excluding the quantity of light based on compensation information $\alpha_B$ from the quantity of light that was measured by way of the G filter. Control unit 104 then controls the quantity of light from light-emitting element (G-LED) 101-3 based on the first compensation light quantity.

Control unit 104 further finds the second compensation light quantity of light-emitting element (B-LED) 102-3 by excluding the quantity of light based on compensation information $\alpha_G$ from the quantity of light that was measured by way of the B filter. Control unit 104 then controls the quantity of light of light-emitting element (B-LED) 102-3 based on the second compensation light quantity.

As a result, the compensation light quantities of light-emitting elements 101-3 and 102-3 are little affected by light from other light-emitting elements, and the output of light-emitting elements 101-3 and 102-3 can be detected with high precision. By controlling the quantity of light from light-emitting elements 101-3 and 102-3 based on the compensation light quantities, the output of light-emitting elements 101-3 and 102-3 can be controlled with high accuracy.

According to the present exemplary embodiment, in a light source made up of a plurality of light-emitting elements having different output light colors, compensation light quantities can be calculated that are free from the influence of the output light from other light-emitting elements and that originate only from the output light from each of the light-emitting elements, and the brightness of the light-emitting elements can be controlled based on these compensation light quantities. As a result, even should fluctuation occur in the quantity of light from a portion of the light-emitting elements that make up the light source due to the deterioration of that portion of the light-emitting elements, the brightness of the other light-emitting elements can be controlled with high accuracy.

Further, the present exemplary embodiment eliminates the necessity of time-dividing emission so as not to light up a plurality of light-emitting elements in order to avoid simultaneous photo-detection of the light of a plurality of colors by a photosensor.

Still further, the present exemplary embodiment eliminates the necessity of providing a plurality of photosensors corresponding to each of a plurality of light-emitting elements and arranging optical elements as well as photosensors in order that light from optical elements that do not correspond to a photosensor does not leak into that photosensor.

Control unit 104 may find a first compensation light quantity and a second compensation light quantity based on the measurement results measured by photosensor 103-3 at predetermined periods, and moreover, in synchronization with these periods, may adjust each of the quantities of light from light-emitting elements 101-3 and 102-3 based on the first compensation light quantity and the second compensation light quantity that were found in the immediately preceding period. In this case, the quantities of light of light-emitting elements 101-3 and 102-3 can be adjusted with the advance of each period.

In addition, control unit 104 may update the images formed in image formation elements 201-3 in synchronization with the period of finding the first compensation light quantity and the second compensation light quantity. In this case, the quantity of light from light-emitting elements 101-3 and 102-3 can be adjusted in one-frame units.

Still further, each of image formation elements 201-1-201-3 uses the output light from the light-emitting element with which it has been placed in correspondence to generate images (for example, a red image, green image, and blue image) that accord with the output light. Cross-dichroic prism 202 mixes the light (image) that is emitted from each of image formation elements 201-1-201-3. Control unit 104 may then control the white balance of light that is mixed in cross-dichroic prism 202 in the next frame based on compensation light quantities that accord with the quantity of light that was measured by photosensor 103-3 for one frame of the images. In this case, the white balance can be adjusted in single-frame units.

In addition, control unit 104 may adjust the quantity of light of predetermined colors that are contained in the light that is mixed in cross-dichroic prism 202 by controlling the quantity of light from light-emitting elements 101-3 and 102-3. In this case, wastage of the quantity of light from light-emitting elements can be suppressed compared to a case in which image formation elements limit the quantity of light of predetermined colors that are contained in the light that is mixed in cross-dichroic prism 202.

Finally, control unit 104 may adjust the quantity of light of predetermined colors that are contained in the light that is mixed in cross-dichroic prism 202 by controlling the quantity of light from light-emitting elements 101-3 and 102-3 and the gain of the image formation elements. In this case, image contrast (number of gradations) can be increased in comparison with a case in which the quantity of light of predetermined colors that are contained in the light that is mixed in cross-dichroic prism 202 is limited by only image formation elements.

Second Exemplary Embodiment

Figure 10:
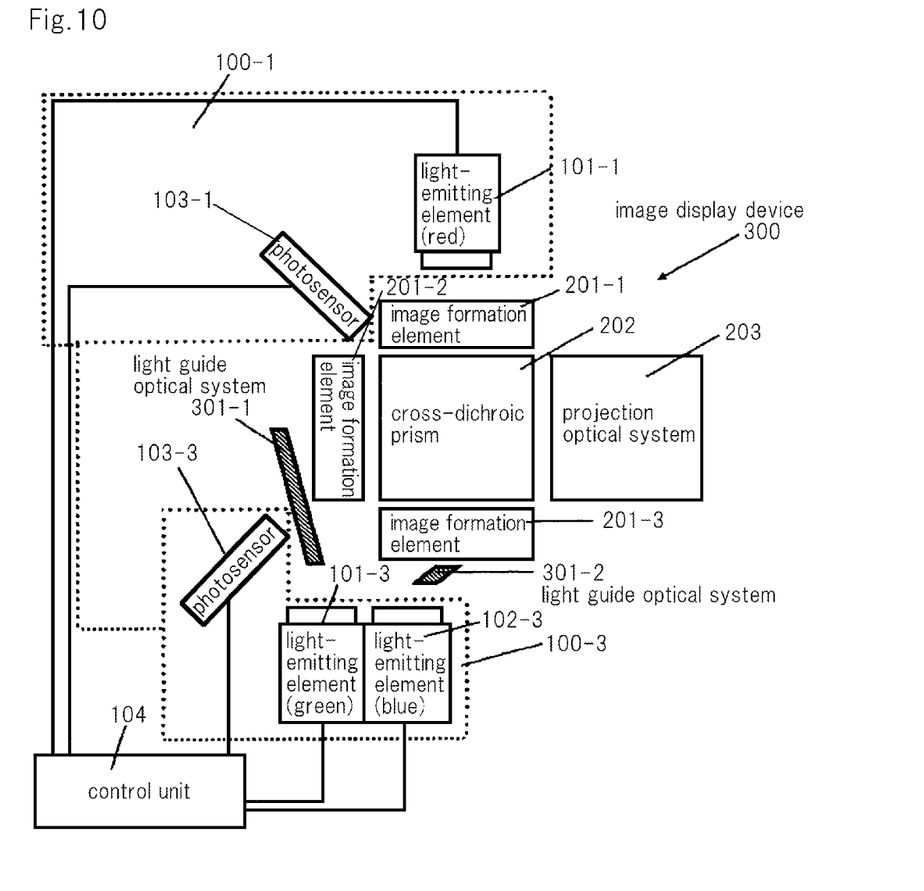
FIG. 10 is a block diagram showing image display device 300 of the second exemplary embodiment of the present invention.

FIG. 10 is a block diagram showing image display device 300 of the second exemplary embodiment of the present invention. In FIG. 10, constructions that are identical to those shown in FIG. 1 are given the same reference numbers.

Image display device 300 is of a configuration in which light-emitting elements 102-1, 101-2, and 102-2 and photosensor 103-2 are omitted and light guide optical system 301-1 and 301-2 are added to image display device 200 shown in FIG. 1.

The following explanation regarding image display device 300 of the second exemplary embodiment focuses on points of difference with image display device 200 of the first exemplary embodiment.

Light guide optical system 301-1 guides green light that is emitted from light-emitting element 101-3 to image formation element 201-2. Light guide optical system 301-2 guides blue light that is emitted from light-emitting element 102-3 to image formation element 201-3.

The present exemplary embodiment enables a decrease in the number of photosensors and light-emitting elements compared to image display device 200 of the first exemplary embodiment.

Although the invention of the present application has been described with reference to each of the exemplary embodiments, the invention of the present application is not limited to the above-described exemplary embodiments. The configuration and details of the invention of the present application are open to various modifications within the scope of the invention of the present application that will be clear to one of ordinary skill in the art. This application claims the benefits of priority based on Japanese Patent Application No. 2012-262783 for which application was submitted on Nov. 30, 2012 and incorporates by citation all of the disclosures of that application.

EXAMPLE OF REFERENCE NUMBERS 100-1-100-3 light source device
101-1-101-3, 102-1-102-3 light-emitting element
103-1-103-3 photosensor
104 control unit
200, 300 image display device
201-1-201-3 image formation element
202 cross-dichroic prism
203 projection optical system
301-1-301-2 light guide optical system

What is claimed is:
1. An image display device, comprising:
a first light source having a first light-emitting element that emits light of a first wavelength band and a second light-emitting element that emits light of a second wavelength band that differs from said first wavelength band, said first and second wavelength bands being visible light wavelength bands;

a first image formation element that uses output light from said first light source to form an image;

a light quantity measurement unit that measures a quantity of light of output light from said first light source; and a control unit that controls said quantity of light based on measurement results of said light quantity measurement unit, wherein:
said light quantity measurement unit comprises a first filter that takes said first wavelength band as its principal detection wavelength band and a second filter that takes said second wavelength band as its principal detection wavelength band; and said control unit:
causes said first light-emitting element and said second light-emitting element to sequentially emit light, acquires from said light quantity measurement unit each of light quantity measurement results that were measured by way of said first filter and said second filter, and, based on the light quantity measurement results, generates first compensation information in which light of said second wavelength band is measured by said first filter and second compensation information in which light of said first wavelength band is measured by said second filter;

finds a first compensation light quantity of said first light-emitting element by excluding a quantity of light based on said first compensation information from a quantity of light that was measured by way of said first filter and controls a quantity of light of said first light-emitting element based on the first compensation light quantity; and finds a second compensation light quantity of said second light-emitting element by excluding a quantity of light based on said second compensation information from a quantity of light that was measured by way of said second filter and controls a quantity of light of said second light-emitting element based on the second compensation light quantity.

2. The image display device as set forth in claim 1, wherein:
said control unit finds said first compensation light quantity and said second compensation light quantity based on measurement results measured by said light quantity measurement unit at predetermined periods, and moreover, in synchronization with these periods, adjusts the quantity of light of each of said first light-emitting element and said second light-emitting element based on said first compensation light quantity and said second compensation light quantity that were found in the immediately preceding said period.

3. The image display device as set forth in claim 2, wherein said control unit updates images formed in said first image formation element in synchronization with said period.

4. The image display device as set forth claim 1, further comprising:
a second light source and a second image formation element that uses output light from said second light source to form an image;
a third light source and a third image formation element that uses output light from said third light source to form an image; and a mixing optical system that mixes light emitted from said first image formation element, light emitted from said second image formation element, and light emitted from said third image formation element, wherein said control unit, based on compensation light quantities that accord with the quantities of light measured by said specific light quantity measurement unit for one frame of said image, controls a white balance of light that is mixed in said mixing optical system in a frame that succeeds said one frame.

5. The image display device as set forth in claim 4, wherein said control unit adjusts a quantity of light of predetermined colors contained in light that is mixed in said mixing optical system, by controlling the quantity from light of said light-emitting elements.

6. The image display device as set forth in claim 4, wherein said control unit adjusts a quantity of light of predetermined colors contained in light that is mixed in said mixing optical system, by controlling the quantity of light from said light-emitting elements and by controlling a gain of said image formation units.

7. The image display device as set forth in claim 1, wherein said light-emitting elements comprise light emitting diodes (LEDs).

8. The image display device as set forth in claim 1, wherein said light-emitting elements comprise laser diodes.

9. An image display method that is carried out by an image display device that includes a first light source that has a first light-emitting element that emits light of a first wavelength band and a second light-emitting element that emits light of a second wavelength band that differs from said first wavelength band, said first and second wavelength bands being visible light wavelength bands, a first image formation element that uses the output light from said first light source to form an image, and a light quantity measurement unit that measures a quantity of light of the output light from said first light source, wherein said light quantity measurement unit includes a first filter that takes said first wavelength band as its principal detection wavelength band and a second filter that takes said second wavelength band as its principal detection wavelength band, said image display method comprising:

causing said first light-emitting element and said second light-emitting element to sequentially emit light, acquiring from said light quantity measurement unit each of light quantity measurement results that are measured by way of said first filter and said second filter, and based on the light quantity measurement results, generating first compensation information in which light of said second wavelength band is measured by said first filter and second compensation information in which light of said first wavelength band is measured by said second filter;

finding a first compensation light quantity of said first light-emitting element by excluding a quantity of light based on said first compensation information from a quantity of light that is measured by way of said first filter and controlling a quantity of light from said first light-emitting element based on said first compensation light quantity; and finding a second compensation light quantity of said second light-emitting element by excluding a quantity of light that is based on said second compensation information from a quantity of light that is measured by way of said second filter and controlling a quantity of light from said second light-emitting element based on said second compensation light quantity.

\* \* \* \* \*